United States Patent [19]

Lake

[11] 4,304,747
[45] Dec. 8, 1981

[54] METHOD OF HEAT-TRIMMING FOAM MATERIAL

[75] Inventor: Connie Lake, Tinley Park, Ill.

[73] Assignee: S. Eisenberg & Company, Division of Creative Industries, Inc., Bridgeview, Ill.

[21] Appl. No.: 75,582

[22] Filed: Sep. 14, 1979

Related U.S. Application Data

[63] Continuation-in-part of Ser. No. 747,953, Dec. 6, 1976, Pat. No. 4,242,074, which is a continuation of Ser. No. 595,530, Jul. 14, 1975, abandoned.

[51] Int. Cl.$^3$ .................. B29C 17/08; B29D 27/00
[52] U.S. Cl. ..................................... 264/156; 264/155; 264/163; 264/321; 425/292
[58] Field of Search ............... 264/155, 321, 156, 163; 425/292

[56] References Cited

U.S. PATENT DOCUMENTS

| | | | |
|---|---|---|---|
| 2,797,179 | 6/1957 | Reynolds et al. | |
| 2,953,814 | 9/1960 | Mumford | 425/292 X |
| 3,173,174 | 3/1965 | Edwards | 425/292 |
| 3,193,367 | 7/1965 | Giffen | 425/292 X |
| 3,338,997 | 8/1967 | Tigner | 425/292 X |
| 3,377,658 | 4/1968 | Wilhoit et al. | 425/292 |
| 3,381,076 | 4/1968 | Govatsos | 264/321 |
| 3,384,696 | 5/1968 | Makansi | 264/321 |
| 3,461,756 | 8/1969 | Mojonnier | 264/155 X |
| 3,475,526 | 10/1969 | Seto | 264/321 X |
| 3,514,509 | 5/1970 | Hoffer et al. | 425/292 X |
| 3,518,334 | 6/1970 | Carrigan et al. | 264/321 X |
| 3,587,377 | 6/1971 | Olson et al. | 83/695 X |
| 3,640,666 | 2/1972 | Jope et al. | |
| 3,640,668 | 2/1972 | Brown et al. | 264/321 X |
| 3,684,633 | 8/1972 | Haase | 264/321 X |
| 3,917,788 | 11/1975 | Padovani | 425/292 X |
| 3,964,850 | 6/1976 | Carnegie | 425/292 |
| 4,104,349 | 8/1978 | Hillgenberg | 264/155 X |
| 4,155,692 | 5/1979 | Kermoian | 425/292 |

Primary Examiner—Philip Anderson
Attorney, Agent, or Firm—Hill, Van Santen, Steadman, Chiara & Simpson

[57] ABSTRACT

A thermoplastic material, such as a sheet of polystyrene or polyethylene foam, is placed between a trim guide, which may be a die, mold or press, and is in the form of at least two heat-conducting metal pieces, one of which is movable towards the other. The trim guide is pressure-operated to pressurize the material along the area to be trimmed. This may be an edge of a plastic sheet, the perimeter of an article produced from the material, or may be holes or slots to be cut in the material. A trim tool, heated to a temperature high enough to melt the material, is then moved along the trim guide. The trim tool melts or vaporizes the pressurized material along the trim guide, which creates a definitive point at which melting or vaporization of the material stops. The trim guide is made from metal having high heat-conductivity, such as aluminum which has sufficient heat-conductivity to create a point at which melting, caused by the trim tool vaporizing the material, stops.

10 Claims, 7 Drawing Figures

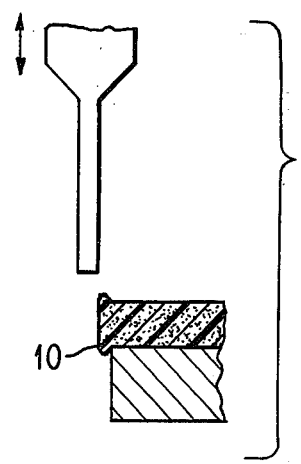
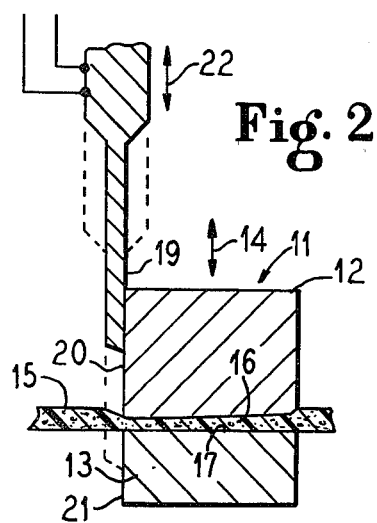
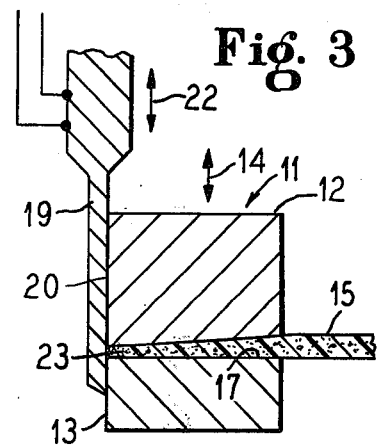
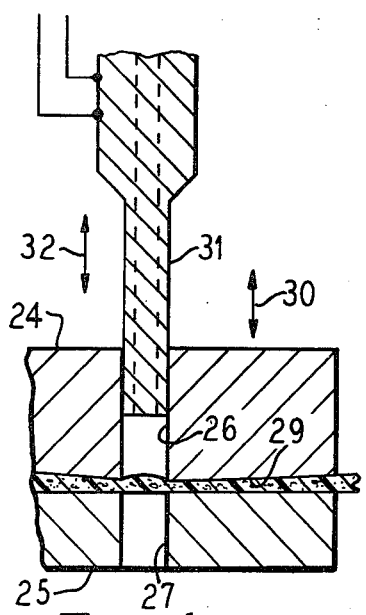
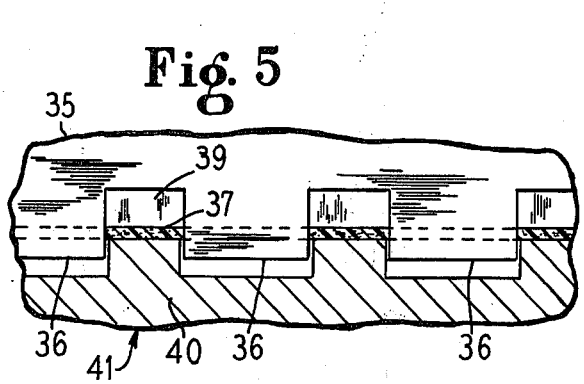
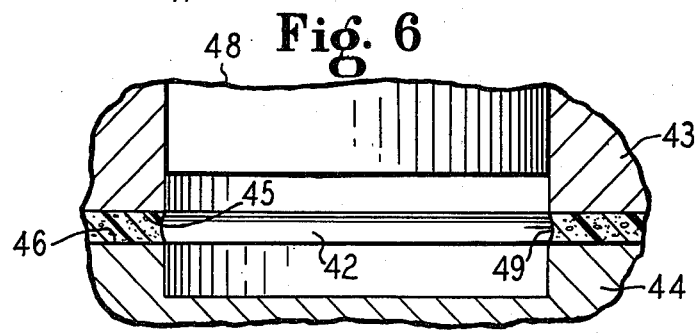

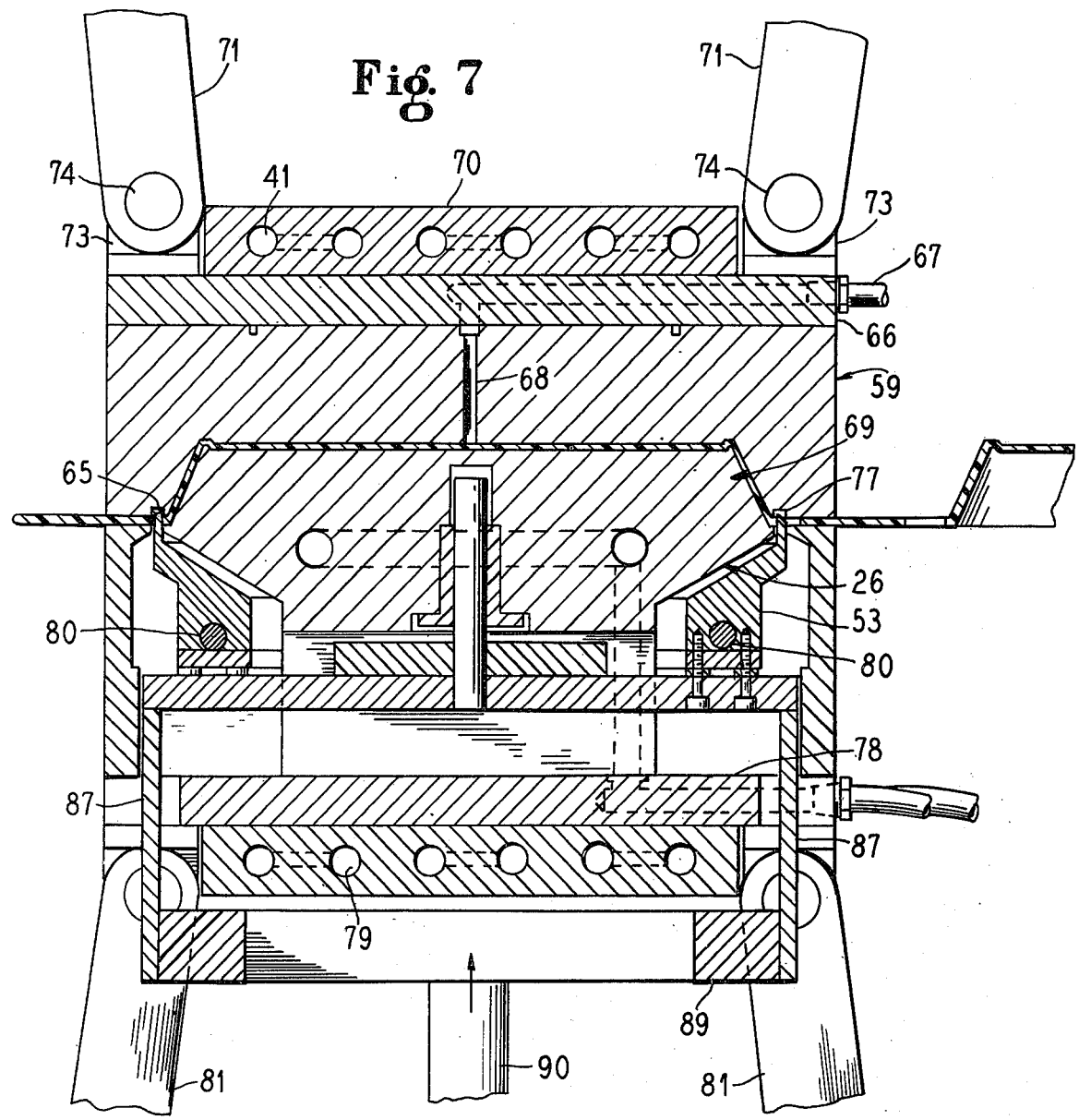

METHOD OF HEAT-TRIMMING FOAM MATERIAL

This application is a continuation-in-part of my application Ser. No. 747,953, filed Dec. 6, 1976 now U.S. Pat. No. 4,242,074 as a continuation of application Ser. No. 595,530, filed July 14, 1975 and now abandoned and contains claims directed to the divisible subject matter.

PRIOR ART, BACKGROUND, SUMMARY AND ADVANTAGES OF INVENTION

Heretofore, thermoplastic materials such as polystyrene or polyethylene foam materials have been trimmed by heat-cutting with a trim tool. This creates a ridge commonly termed flash on the formed side of the material, which must be removed in a separate trimming operation. It also leaves a residue on the trim tool, which is rarely heated to a temperature high enough to vaporize the material. This residue must frequently be removed in order that the trim tool may perform an effective trimming operation.

Examples of prior art apparatus and processes are in the patents to Huppenthal et al U.S. Pat. Nos. 3,707,102, Haase 3,684,633, Seto 3,475,526, Byrne 3,572,424, Langdon et al 3,362,043 and Scalora 3,240,851.

In accordance with the principles of the present invention, trimming of the thermoplastic material may be attained without exerting pressure on the material and the flash or ridge formerly formed by the trim tool is avoided by pressurizing the material along the edge to be trimmed by a trim guide or mold in the form of two pieces of metal of high heat-conductivity, which usually are in the form of cooperating mold parts between which the material is placed when molded to form. These two mold parts or trim guides are made from metal of high heat-conductivity and may be moved relative to each other to pressurize the material along the area to be trimmed.

The plastic material may be a polystyrene or polyethylene foam of various densities, and may have a lamina of high-density polystyrene film on one side thereof which may be an oriented thermoplastic film forming an outer lamina of high-density.

A trim tool heated to a temperature high enough to melt the thermoplastic material, which may even be high enough to vaporize the material, is then used to trim the material along the trim guide and provide a cleanly trimmed edge without touching the thermoplastic material. The trimmed edge may be an internal or external edge and when so formed, has no flash or heat ridge.

The trim guide is preferably made from aluminum, but may be made from other metals having a high heat-conductivity, and holds and pressurizes the material along the area to be trimmed and absorbs the heat of trimming so the heat ridge or flash formerly present in heat-trimming foam materials has no place to form. The trim guide may be the parts of a mold or die, and may be formed to accommodate a heated trim tool to trim the external periphery of an article to be formed or may be formed to accommodate a heated trim tool to place slots or apertures of various forms in foam material as the material is pressurized along the portion to be slotted or apertured as the heated trim tool performs the slotting or aperturing operation.

The advantages of the present invention are that the deficiencies of heat-trimming thermoplastic foam materials, such as polystyrene or polyethylene foam are obviated by pressurizing the thermoplastic material to be trimmed along its edge or perimeter to be trimmed by the use of two pieces of metal of high heat-conductivity, and trimming the material along the two pieces of metal by a heated trim tool, which may be hot enough to vaporize the material along the pieces of metal, in which the pieces of metal form a heat barrier at which the melting of the thermoplastic material stops.

Another advantage of the invention is that the heat ridge heretofore formed by trimming thermoplastic materials and particularly foam materials with a hot trim tool is obviated by the use of a trim tool hot enough to melt the material and moving this tool relative to surfaces of high heat-conductivity, pressurizing the edge of the material trimmed, and maintained cold enough to provide a heat barrier, absorbing the heat of melting.

A still further advantage is that by confining the foam material between two pieces of metal of high heat-conductivity and exerting pressure on the material along the edge of perimeter to be trimmed, a definitive point is created at which melting by the heated trim tool stops.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure.

DESCRIPTION OF THE DRAWINGS

FIG. 1 is a diagrammatic view illustrating the heat ridge formed by the prior art methods of trimming foam material by a heated trim tool;

FIG. 2 is a diagrammatic view illustrating the pressurizing of the foam material by a trim guide constructed in accordance with the principles of the present invention, and showing the material trimmed by a heated trim tool;

FIG. 3 is a diagrammatic view somewhat similar to FIG. 2 and illustrating the completion of a trimming cut, showing the form the trimmed material will take along its edge at the termination of a trimming operation;

FIG. 4 is a diagrammatic view illustrating the slotting of a piece of thermoplastic foam material by a heated slotting tool;

FIG. 5 is a diagrammatic view illustrating the principles of the present invention which may be utilized to place elongated slots or apertures in a piece of thermoplastic foam material;

FIG. 6 is a diagrammatic view illustrating the principles of the present invention applied to the placing of a circular aperture or to the making of an internal continuous aperture in a piece of thermoplastic foam material; and FIG. 7 is a partial fragmentary sectional view taken through a pair of cooperating molds and trim tool, illustrating a preferred form of mold and trim tool for carrying out the principles of the present invention.

DESCRIPTION OF PREFERRED EMBODIMENTS OF INVENTION

FIG. 1 of the drawings diagrammatically illustrates a prior art method of trimming thermoplastic material, and particularly polystyrene or polyethylene foam, by a heated trim tool which may be in the form of a thin knife or other form of trim tool commonly used for such operations. Such trimming operations by a heated trim tool leave a ridge or flash 10 on the formed sides of the thermoplastic material which must thereafter be trimmed to provide a clean edge free from flash. A residue may also form on the trim tool due to the fact that the trim tool cannot be heated to a temperature high enough to vaporize the thermoplastic material on the trim tool. This residue should be removed prior to each trimming operation.

In FIGS. 2 and 3 of the drawings, I diagrammatically illustrate the principles of the present invention and provide a trim guide 11 which may be in the form of the cooperating parts of a mold, although it need not necessarily be a mold or die, and may have upper and lower mold parts 12 and 13 respectively, adapted to have a sheet of thermoplastic material 15 placed therebetween. The mold parts 12 and 13 may be made from a metal of high heat-conductivity, such as aluminum, to provide a heat barrier and definitive edge along which melting of the material by the trimming operation stops.

The mold parts may be cooled to provide a heat barrier absorbing the heat of melting. The lower mold part 13 may be stationary while the upper mold part 12 may be moved toward and from the lower mold part by suitable means such as power means diagrammatically illustrated by the double-headed arrow 14. The mold or die parts may, of course, both be moved toward and from each other. As shown in FIGS. 2 and 3, the upper mold part has a bottom surface 16 inclined toward the outer edge of the trim guide, although it may be perpendicular to the outer edge of the trim guide to cooperate with the upper surface of the lower mold part 13 to squeeze or pressurize the foam material along the edge trimmed.

Means may be provided (not shown) for maintaining the temperature of the mold parts at a temperature range of between 30° and 120° F. In this connection, it should be understood that the mold parts obtain heat only from the foam material and the heated trim tool 19 trimming the foam material along the edge of the mold or trim guide.

A polystyrene or polyethylene foam may be in the form of a sheet and usually is conveyed from an oven prior to forming and trimming at a temperature in the order of 350° F. where the sheet is to be formed into an article such as a plate or any other article which may advantageously be formed from foam material. Of the plastic materials used for forming plates, cups and other articles, a polystyrene foam is more commonly used than polyethylene foam or other foam materials. The material will hereinafter be referred to throughout the specification as a polystyrene foam, although the invention is not intended to be limited to polystyrene foam. The foam further may be of various densities depending upon the use to which the article is to be put and may also be laminated with an outer relatively dense lamination of polystyrene foam with an inner lamina of an oriented thermoplastic film, preferably a biaxially oriented polystyrene film. The laminations are not herein shown or described since they form no part of the present invention and are only utilized where a dense surface is required on one side of the film and a less dense or porous surface may be on the opposite side of the film. The trim tool 19 is suitably guided for movement along trim edges 20 and 21 of the die parts 12 and 13, respectively, to sever the foam sheet by melting or vaporizing the sheet as the knife passes along the trim edges 20 and 21. The knife is diagrammatically shown as being electrically heated and may be heated to a melting or vaporizing temperature that will melt or vaporize the plastic as the trim tool passes through the material to sever the material along the trim edges 20 and 21 without exerting pressure on the material.

The heated trim tool 19 may be suitably guided and moved by power along the respective trim edges 20 and 21 to trim the sheet of plastic material and may then be withdrawn therefrom. The means for moving the trim tool along the trim edges 20 and 21 is diagrammatically illustrated by a double-headed arrow 22.

FIG. 3 shows the trim tool 19 at the completion of a trimming operation of the foam material and shows the form the material will take along its edge when trimmed, which may slightly recede as indicated by a reference numeral 23, caused by the melting or vaporization of the material and shows the edge to be completely free from a heat ridge formed by prior trimming operations in which trimming is by heat.

The foam material pinched along the edge to be trimmed by the mold parts 12 and 13 of the trim guide is thus held between the mold parts 12 and 13 at the temperature of the trim tool 19, which is at a temperature sufficient to melt or even vaporize the material during the trimming operation. The usual heat ridge, therefore, has no place to form since the mold parts 12 and 13 by their low temperature and high heat-conductivity create a definite region at which melting of the foam material by heat-trimming stops.

The mold parts 12 and 13 thus restrict melting of the foam material by the trim tool and are cold enough to stop melting along the trim edges of the mold parts.

In FIG. 4, I have illustrated the principles of my invention applied to forming rectangular holes in foam material. In this form of the invention, mold parts 24 and 25 are provided with registering apertured portions 26 and 27, respectively, which may pass entirely through said mold parts. The mold part 24 is shown as having bottom tapering die surfaces 29 tapering toward the apertured portion 26 to pressurize or confine the edge of the material about the portion thereof to be formed into an apertured portion or hole. The mold part 24 is diagrammatically shown by the double-headed arrow 23 as being movable toward and from the mold part 25 to exert pressure on the material and effect a pinching or pressurizing action thereon about the portion to be formed into an aperture. The mold parts, of course, may both be simultaneously moved toward and away from each other.

A heated trim tool 31, heated to the melting or vaporizing temperature of the foam material and conforming to the apertured portions 26 and 27, may be moved along said apertured portions by power to effect the formation of an aperture conforming to the form of the apertured portions 26 and 27, as illustrated by the double-headed arrow 32.

As shown in FIG. 4, the trim tool 31 is hollow and has melting edges conforming to the internal periphery of the hole to be formed, although it need not be hollow, but may be solid or may be in the form of a plurality of thin trim tools connected to operate together and form a desired aperture in the material. The trim tool 31 is diagrammatically shown as being electrically heated, which is a preferable means for maintaining the trim tool at the desired temperature.

In FIG. 5, I have shown a further embodiment of the invention in which a heated trim tool 35 is provided with a plurality of separate parallel trim blades 36 which may be formed to melt a series of slots in a piece of foam material 37 pressurized along the edges of the slots by upper and lower mold parts 39 and 40 of a mold 41, formed to provide a trim guide for controlling the trimming of the slots or apertures in the pressurized foam material 37. The trim tool 35 may be electrically heated and the mold parts forming the trim guide may be constructed and arranged to operate on the same principles as the mold parts 12 and 13 of the trim guide 11.

In FIG. 6 of the drawings, I diagrammatically illustrate the cutting of a cylindrical hole in the piece of thermoplastic material 42. Mold parts 43 and 44 have facing surfaces 45 and 46 formed to pressurize the foam material along the apertured portion to be formed. An annular trim tool 48, which may be hollow, is moved along the registering apertured portions of the mold parts 43 and 44 and is electrically heated at a temperature high enough to melt or vaporize the foam material and form a cylindrical hole therein, the edge of which may be slightly recessed, by the heat-conductivity of the cooled mold parts 43 and 44. The recessed portion is indicated by reference numeral 49. The trim tool 48, like the trim tool 31, may be hollow and preferably is a hollow trim tool, although where small cylindrical holes are to be formed, the trim tool need not necessarily be hollow, but may be solid.

In all forms of the invention illustrated in FIGS. 2 through 6 inclusive, the trimming operation is the same regardless of whether the thermoplastic foam material is to be trimmed along an edge which may be of any desired form or whether this edge is an internal or external edge. The mold parts of the trim guide in all instances serve to absorb the heat of melting of the foam material during trimming thereof and are maintained cold enough to create a definite region stopping melting of the material along the trimmed edges thereof.

In FIG. 7 of the drawings, I have illustrated a form of mold for carrying out the principles of the present invention, which may be used to form an article such as a dish or plate, from a sheet of polystyrene or polyethylene foam.

FIG. 7 is FIG. 5 of my application Ser. No. 030,313, filed Apr. 16, 1979 and incorporated in the present application as a part thereof in order to show a preferred form of cooperation of a heated trim tool 53 with the molds in the heat-trimming of an article to be formed.

In the disclosure of application Ser. No. 030,313, the heated trim tool trims only the leading and trailing ends of the article, but it should be understood that where the article is a round plate or a plate with a generally rectangular or regular perimeter, the heat-trimmer or plurality of heat-trimmers may trim the entire outer perimeter of the article.

As shown in FIG. 7, cooled forming molds 59 and 69 are mounted for movement toward and from each other to close and open the molds and to enable a sheet of heated thermoplastic foam material to be conveyed therebetween and to exert pressure on the sheet to form the sheet to the form of the molds.

The trim tool 53 may be heated to the melting or vaporizing temperature of the foam material and may cooperate with the cooled molds 59 and 69, so the molds will absorb the heat of melting and thereby define the end margins of the foam material. The trim tool 53 is herein shown as being movable independently of the molds 59 and 69, although it may move with either one of said molds and at least one mold may move relative to said heat-trimmer.

In order to melt or vaporize the foam material, the trim tool 53 may be heated to a temperature of 800° F. or under, depending upon the type of material to be trimmed, it being understood that the flash point of polystyrene foam is in the order of 926° F. and that the trim tool should not be heated to this temperature.

The upper mold 59 is shown as a recessed or a female mold, formed to conform to the article to be formed, which in FIG. 7 is shown as being a tray.

The male mold 69 is formed to cooperate with the mold 59 and mate therewith and press the heated web into the upper mold and conform the heated web thereto in a conventional manner.

The upper mold 59 is shown as secured to a plate 66 having a vacuum passageway 67 leading therefrom and communicating with a vacuum passageway 68 for withdrawing air from the cavity of the mold during the web forming or molding operation and thereby enabling the male mold to uniformly conform the web to the cavities formed in the female mold 59. The mold 59 is preferably formed from a heat-conducting material such as aluminum. The plate 66 is placed between the top of said mold and a cooling plate 70 having serpentine passageways 41 leading therealong for substantially the length and width of said plate, to maintain the temperature of the mold 59 at a low enough temperature to absorb the heat of melting of the web by trimming by the heated trim tool 53. The serpentine passageways 41 are closed at each end.

The means for moving the mold 59 to open and close said mold may be of any conventional form, such as toggle links 71 extending along opposite sides of ears 73 projecting upwardly from the top of the plate 66 and pivoted to said ears as by pivot pins 74. The toggle links may be operated to raise and lower the mold as by a crank mechanism of a cylinder and piston mechanism as is conventional with such molds, to assure a uniform up and down movement of the mold parallel to movement of the male mold 69. Said mechanism need not herein be shown or described since it forms no part of the present invention.

The male mold 69 may be movable relative to the mold 59 and is also made from a metal of a high heat-conductivity, such as aluminum and is cooled by cooling passageways passing through the large bulk of said mold. A plate 77 is spaced beneath the bulk of the male mold 69 and is abutted by a cooling plate 78, like the cooling plate 70, and having serpentine coolant passageways 79 therein, closed at the ends of said passageways. Said passageways serve to circulate coolant along said cooling plate 78 to maintain said cooling plate, and the mold 69 to a temperature which will absorb the heat of melting as the web is trimmed by the trim tool 53. Suitable inlet and outlet passageways (not shown) are provided for admitting and releasing fluid to and from the serpentine passageways 79 and to accommodate the circulation of coolant along said passageways. The mold 69 is moved up and down toward and from the mold 59 by a toggle linkage arrangement 81 like the toggle linkage arrangement 73 in a manner like that shown in my application Ser. No. 030,313, so not herein shown or described. The upper and lower molds 59 and 69 may thus be moved in timed relation relative to each other to form the portion of the web therebetween to the form of said molds and to open said molds to accommodate the web and partially formed articles to pass thereby. The trim tool 53 may be of various forms conforming to the form of the article being trimmed and is shown in FIG. 7 as having a heat-trimming edge 65, shown as being beveled to a knife-like trimming edge, although they need not be so beveled. Said heat-trimming edge may conform to the perimeter of the article or to the portion of the article to be trimmed, where only opposite ends of the article are heat-trimmed and which may be of any desired form, to melt or vaporize the portion of the article without exerting pressure on the article, and to accommodate the cooled heat-conducting molds to absorb the heat of melting.

As shown in FIG. 7, the trim tool 53 and forming end 65 thereof extends vertically of inclined surfaces conforming to a downwardly facing inclined surface 76 of the male mold and are positioned to extend within a groove 77 in the mold 59 which opens toward the web 12. Said forming end 65 clears the groove 77 on the top and both sides thereof and is out of contact with the cooperating edges of the mold 59 and the groove 77 in the mold 59. This keeps the trimming edge of the trim tool out of contact with the mold during the trimming operation.

Trimming is thus attained purely by melting or vaporizing the foam material either as the molds are moving toward a closed position and compress the edges of the foam material to be trimmed, or after movement of the molds to a closed position or by movement of the mold part 59 relative to the trim tool. The edges of the mold 69 thus determine the trim margin of the tray rather than the trim tool. The trim tool 53 is moved toward and from the web by vertical actuator bars 87 extending upwardly of an actuating member 89, which may be a plate. The actuating member 89 may have a drilled and threaded central portion (not shown) for receiving a piston rod 90 which may extend from a cylinder (not shown). The admission of fluid under pressure to one end of said cylinder will thus move the trim tool into position to extend within the groove 77 in the mold 59 to effect trimming of the article by heat, independently of closing movement of the molds 59 and 69, which compress or pressurize the edges trimmed and terminate the trimming operation by absorbing the heat of trimming.

The heat-trimmer may also be positioned in the position shown prior to closing the mold and the foam thermoplastic material may be heat-trimmed as the mold 59 moves downwardly to effect a molding operation.

It should here be understood that the heat-trimmer does no cutting and that trimming is done solely by melting or vaporizing the foam material, and melting is stopped by the molds which are maintained cool enough to absorb the heat of melting of the foam material.

The heat-trimmer has a heating element 80 which may extend along the portion to be trimmed. Said heating element or elements may be in the form of coils or may be cal-rod heaters and energized through electrical connectors (not shown). The trim tool 53 is thus heated to the melting or vaporizing temperature of the thermoplastic material, which may vary depending upon the density and type of foam material to be trimmed, in order to maintain the trimming edges to the melting or vaporizing temperature of the thermoplastic material as formed and trimmed.

I claim as my invention:

1. A method of heat-trimming thermoplastic foam articles comprising the steps of:
    providing a mold in the form of two pieces of heat-conducting metal, at least one edge of which forms a trim guide,
    moving the pieces of heat-conducting metal relative to each other to open and close the mold,
    heating a sheet of thermoplastic foam material to oven temperature,
    passing the heated sheet of thermoplastic foam material between the pieces of heat-conducting metal,
    conforming the thermoplastic foam material to the form of the pieces of heat conducting metal by moving at least one piece relative to the other,
    heating a trim tool to a temperature high enough to melt the foam material and positioning the trim tool along the at least one edge of the trim guide to melt the foam material by the trim tool to the edge of the trim guide, and
    maintaining the pieces of heat-conducting metal cool to absorb the heat of melting of the foam material along the trim guide and provide at least one clean edge free from flash.

2. A method of forming apertures in thermoplastic materials comprising the confining of the material about the portion where the aperture is to be formed by a heat-conducting metal mold on each side of the material having an internal perimeter defining an aperture, cooling the mold, and then melting the foam material about the internal perimeter defining the aperture, by the trim tool heated to the melting temperature of the foam material and absorbing the heat of melting by the cooled mold.

3. The method of claim 2, wherein the trim guide exerts pressure on the foam material about the portion of the perimeter defining the apertured portion thereof, and including the melting of the material by a heated trim tool heated to the melting temperature of the foam material and absorbing the heat of melting by the cooled trim guide and thereby defining trimmed edges free from flash.

4. The method of claim 3, wherein the trim guide exerting pressure on the foam material is aluminum and is maintained cool enough to provide a definitive point at which vaporization of the material stops, and the trim tool is heated to a temperature below the flash point of the foam material.

5. In a method of heat-trimming thermoplastic foam articles, the steps of:
    providing a mold in the form of two registering pieces of heat-conducting metal, at least one edge of which forms a trim guide,
    trimming the material along at least one edge of the trim guide by melting the material along the trim guide while maintaining the trim guide cool enough to absorb the heat of melting.

6. The method of claim 5, in which the trim guide is utilized to exert pressure on the material along the edges trimmed.

7. The method of claim 5, in which the pieces of metal forming the trim guide pressurize the material along an internal perimeter and the heated trim tool vaporizes the material within the perimeter to define an aperture.

8. In a method of heat-trimming thermoplastic foam materials, the steps of:
    providing a mold in the form of two mold pieces of metal of high heat-conductivity in substantially vertical alignment with each other, said mold pieces having at least two aligned edges forming a trim guide, placing a sheet of foam material at oven temperature between said mold pieces of high heat-conductivity, providing a trim tool, heating the trim tool to a temperature at least high enough to melt the foam material, cooling the mold pieces to absorb the heat of melting of the foam material;

moving the mold pieces of high heat-conductivity relative to each other to form the foam material to the form of the mold and pressurize the foam material along the portion to be trimmed, positioning the heated trim tool relative to the mold along the aligned edges thereof forming the trim guide, and trimming the piece of foam material along the trim guide by melting or vaporizing the portion of the foam material along the trim guide and stopping melting of the foam material along the trim guide by absorbing the heat of melting by the trim guide, and thereby preventing the formation of flash along the trimmed edge of the foam material.

9. In a method of heat-cutting thermoplastic materials the steps of:

providing two mold pieces of metal of high heat-conductivity in vertical alignment with each other at least one edge of each piece forming a trim guide, moving at least one piece of metal toward the other to form a pressure exerting device and confine and pressurize the foam material along the region to be trimmed, providing a cutter, heating the cutter to a temperature at least high enough to melt the foam material, placing a sheet of foam material between the pieces of metal of high-conductivity forming the trim guide, moving the pieces of heat-conducting metal toward each other and pressurizing the piece of foam material along the portion to be trimmed, and maintaining the heat conducting metal cool enough to absorb the heat of melting to thereby provide a definite point at which melting stops, then bringing the heated cutter along the trim guide and trimming the piece of foam material along the trim guide by melting the foam material and stopping melting thereof at the edge of the trim guide by absorption of the heat of melting by the cooled trim guide.

10. The method of claim 9, in which the two pieces of metal of high heat-conductivity are aluminum and the cutter is heated to the vaporizing temperature of the foam material.

* * * * *